United States Patent
Rothhämel et al.

(10) Patent No.: US 8,958,950 B2
(45) Date of Patent: Feb. 17, 2015

(54) METHOD AND ARRANGEMENT FOR STEERING OF A VEHICLE, COMPUTER PROGRAM, COMPUTER AND A VEHICLE

(75) Inventors: Malte Rothhämel, Huddinge (SE); Jolle Ijkema, Södertälje (SE)

(73) Assignee: Scania CV AB (publ) (SE)

(*) Notice: Subject to any disclaimer, the term of this patent is extended or adjusted under 35 U.S.C. 154(b) by 76 days.

(21) Appl. No.: 13/145,402

(22) PCT Filed: Jan. 26, 2010

(86) PCT No.: PCT/SE2010/050068
§ 371 (c)(1),
(2), (4) Date: Jul. 20, 2011

(87) PCT Pub. No.: WO2010/093309
PCT Pub. Date: Aug. 19, 2010

(65) Prior Publication Data
US 2011/0276228 A1    Nov. 10, 2011

(30) Foreign Application Priority Data
Feb. 10, 2009    (SE) ...................... 0950067

(51) Int. Cl.
*B62D 6/00* (2006.01)
*B62D 5/02* (2006.01)
*B62D 7/22* (2006.01)
*B62D 1/16* (2006.01)
*B62D 1/00* (2006.01)

(52) U.S. Cl.
CPC *B62D 7/224* (2013.01); *B62D 1/16* (2013.01); *B62D 1/00* (2013.01)
USPC .......................... 701/41; 180/447

(58) Field of Classification Search
CPC ............ B62D 5/02; B62D 7/224; B62D 6/00; B62D 1/00
USPC .................... 701/41; 180/142, 164, 400, 402; 74/492, 552; 29/894.1
See application file for complete search history.

(56) References Cited

U.S. PATENT DOCUMENTS

| 4,771,846 A | * | 9/1988 | Venable et al. | 180/422 |
| 5,749,431 A | * | 5/1998 | Peterson | 180/422 |
| 6,899,196 B2 | * | 5/2005 | Husain et al. | 180/402 |
| 6,910,699 B2 | * | 6/2005 | Cherney | 280/89.13 |
| 2007/0137955 A1 | * | 6/2007 | Maranville et al. | 188/267.2 |

FOREIGN PATENT DOCUMENTS

| JP | 2007-030703 A | | 2/2007 |
| JP | 2007030703 A | * | 2/2007 |

OTHER PUBLICATIONS

JP 2007030703 English translation.*
International Search Report dated Apr. 16, 2010, issued in corresponding international application No. PCT/SE2010/050068.

* cited by examiner

*Primary Examiner* — Fadey Jabr
*Assistant Examiner* — Yazan A Soofi
(74) *Attorney, Agent, or Firm* — Ostrolenk Faber LLP

(57) ABSTRACT

A method for variation of steering sensation in a steering arrangement of a vehicle, e.g. a truck, which steering arrangement comprises a steering column (115) via which rotary motion is transmitted between an operating device (100), e.g. a steering wheel (100), and a servo device (9120) of the steering arrangement. The method includes the steps of—varying the rotational resistance of the steering column (115) as regards the rotary motion and/or—varying the moment of inertia of the steering column (115) as regards the rotary motion and—activating the variation manually via an operator, e.g., the driver of the vehicle, and/or automatically. The invention relates also to a device for variation of steering sensation, a computer program for that purpose, a computer and a vehicle with this program.

33 Claims, 4 Drawing Sheets

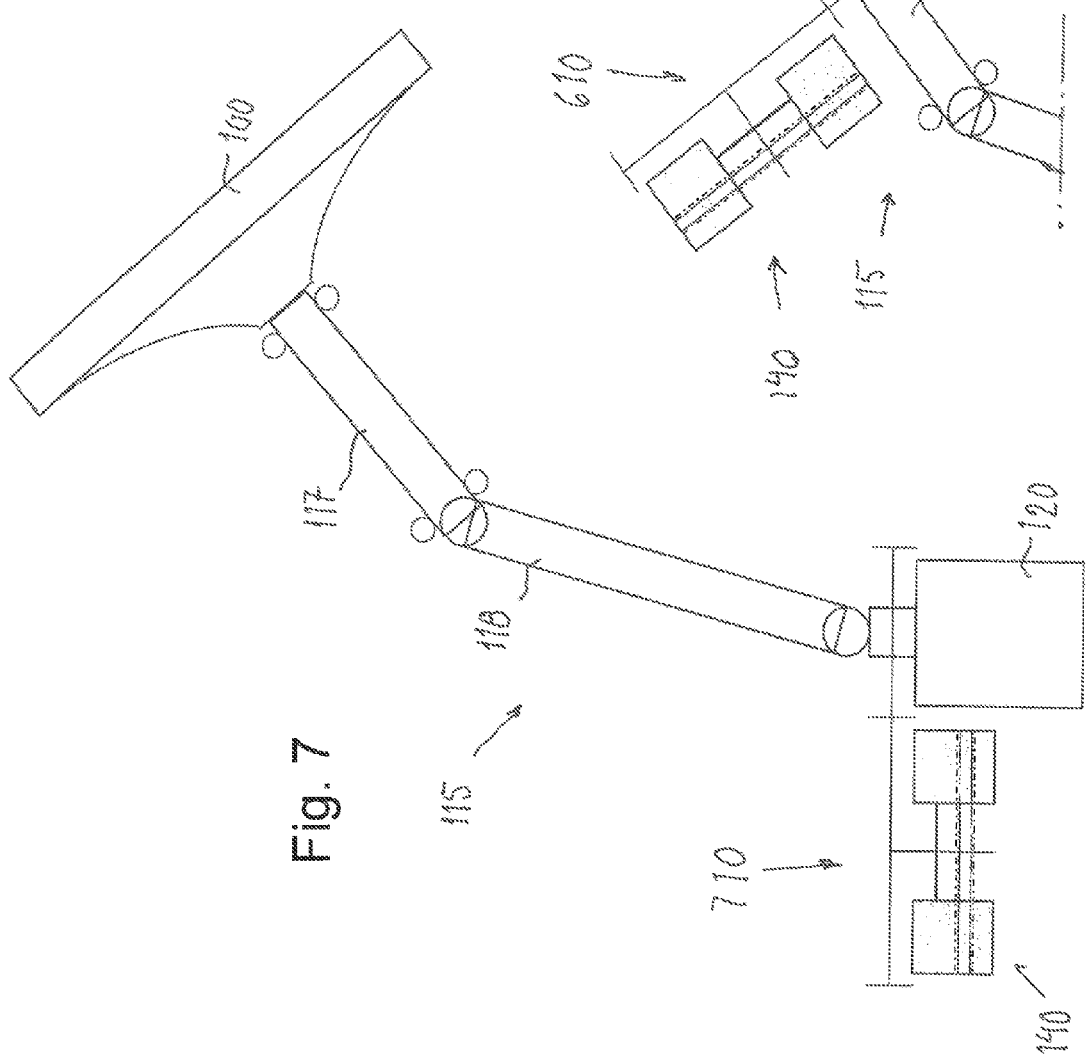

METHOD AND ARRANGEMENT FOR STEERING OF A VEHICLE, COMPUTER PROGRAM, COMPUTER AND A VEHICLE

CROSS-REFERENCE TO RELATED APPLICATIONS

The present application is a 35 U.S.C. §§371 National Phase conversion of PCT/SE2010/050068 filed Jan. 26, 2010, which claims priority of Swedish Application No. 0950067-9, filed Feb. 10, 2009, the contents of which are incorporated by reference herein. The PCT International Application was published in the English language.

BACKGROUND OF THE INVENTION

1. Technical field

The present invention relates to a method for varying the steering sensation in a steering arrangement in a vehicle and to a device for varying the steering sensation, according to the invention.

The invention relates also to a computer program for varying the steering sensation in a steering arrangement in a vehicle, a computer so programmed and a vehicle with such computer program.

2. State of the art

A given steering arrangement configuration with, inter alia, steering wheel, steering column etc. provides a given steering sensation and is often a compromise intended to reduce, inter alia, vibrations in the steering wheel while at the same time maintaining road sensation. However, the potential for meeting individual wishes concerning steering sensations is extremely limited.

There are known systems of the "steer by wire" type in which operating means, usually a steering wheel, are connected electronically, i.e. not directly connected mechanically, to the mechanical steering arrangement of a vehicle. In such cases, hardly any steering sensation or road sensation is transmitted from the mechanical steering arrangement to the steering wheel. In systems of this kind attempts have been made, in more or less complicated ways and, inter alia, for safety reasons, to provide simulated steering wheel sensation.

Steering sensation or, if so desired, steering wheel sensation is individual and likely different for different drivers, perhaps particularly for heavy vehicles, such as trucks. Sensation is affected by vehicle-specific parameters which relate inter alia both to the vehicle's steering system and to external parameters, e.g. the respective carriageway, which external parameters contribute to creating, inter alia, road sensation.

An object of the present invention, in a steering arrangement of a prevalent kind, i.e. with mechanical connection between a steering wheel and the remainder of the steering arrangement, is to provide for variation of steering sensation in order to adapt, inter alia, to individual wishes.

SUMMARY OF THE INVENTION

This and other objects of the present invention are achieved with a method and a device with features according to the invention, and with a computer program, a computer and a vehicle with features according to the invention.

BRIEF DESCRIPTION OF THE DRAWINGS

Better understanding of the present invention should be achieved in the light of the following detailed description read in conjunction with the attached drawings, in which the same parts bear the same designations in the various views, and in which FIG. 6 depicts schematically a side view of part of a steering column with a second embodiment of a device according to the present invention, and FIG. 7 depicts schematically a side view of a steering column with a third embodiment of a device according to the present invention.

DETAILED DESCRIPTION OF PREFERRED EMBODIMENTS

Figure 1:
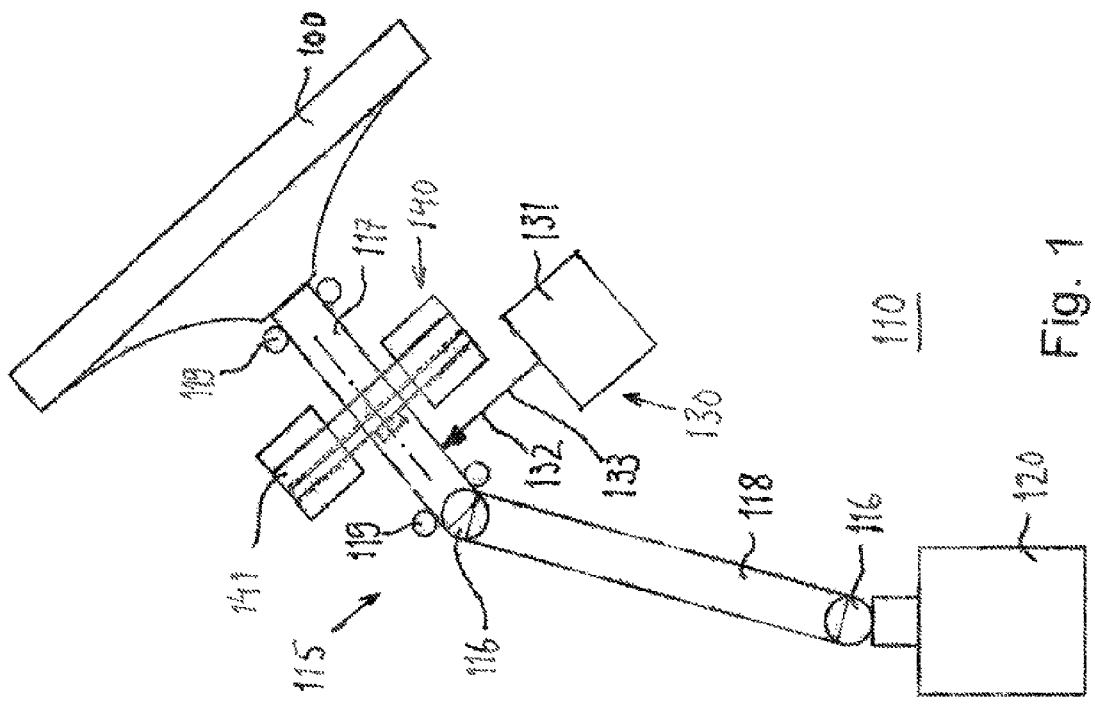
FIG. 1 depicts schematically a side view of a steering column with a first embodiment of a device according to the present invention.

In FIG. 1, an operating means or device 100 is in the form of a steering wheel of a steering arrangement 110 of a vehicle, e.g. a truck. The steering arrangement comprises a steering column 115 via which rotary motion is intended to be transmitted between the steering wheel and a servo device 120 of the steering arrangement. The steering wheel represents an example of operating means for providing the rotary motion.

In the version depicted, the steering column comprises at least two column elements 117,118 for effecting settability of steering wheel position. These elements are mutually articulated, e.g. by universal joints 116 at their respective neighboring ends. Schematically depicted bearings 119 for the column element 117 support the steering wheel.

To make it possible according to the invention to vary steering sensation, or steering wheel sensation, the vehicle's steering arrangement is provided with devices 130,140 for varying respectively the rotational resistance and moment of inertia of the steering column 115.

The devices 130 for variation of the rotational resistance to rotary motion comprise, according to a version, schematically depicted brake devices 131 adapted to acting directly or indirectly upon a column element 117,118.

According to a version, the brake devices 131 comprise friction-generating devices 132, not depicted in detail, e.g. in the form of a disc brake device with a brake disc associated with the column element, and friction elements movable, preferably electrically, towards and away from the brake disc. Other friction-generating solutions are of course conceivable.

According to another version, the brake devices 131 comprise magnetorheological damper devices 133 adapted to acting upon a column element, and the braking action is intended to be varied by electrical means.

Figure 2A:
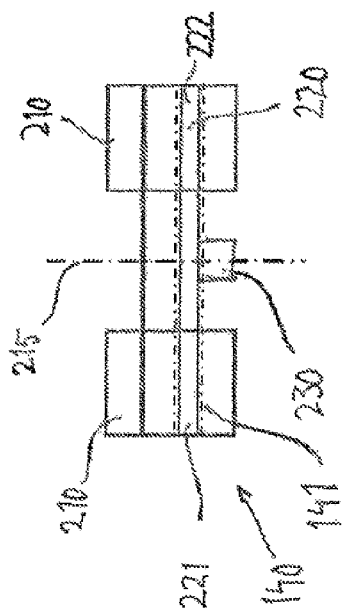
FIGS. 2a and 2b depicts schematically two different versions of a device according to FIG. 1 for alteration of moment of inertia of the steering column.
Figure 2B:
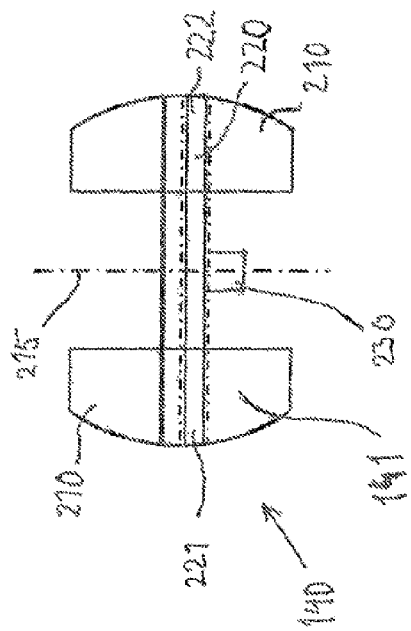

According to a version, the devices 140 for variation of the moment of inertia of the steering column comprise, as schematically depicted in FIGS. 1, 2a, and 2b, weight devices 141 to which the rotary motion is intended to be transmitted and whose moment of inertia is intended to be altered by redistribution of their weight. According to the versions depicted in more detail in FIGS. 2a and 2b, the weight devices comprise preferably at least two symmetrically arranged weight elements 210 adapted to being movable substantially transversely relative to an axis of rotation 215 of said weight devices, to which the rotary motion of the steering column is intended to be transmitted, as schematically depicted in FIGS. 2a and 2b. The movement may for example be effected by rotation of a threaded spindle 220 through the weight elements by a preferable electric motor 230, the portions 221,222 of the spindle which cooperate with the respective weights being threaded in mutually opposite directions in order to move the weight elements synchronously towards and away from one another.

The devices, e.g. of the kind represented by the weight devices, may be fitted in or on the steering column or alongside the steering column, FIG. 6 and FIG. 7, and be connected in such cases to the steering column via a gearbox 610,710 for transmission of rotary motion. However, the previously described embodiment, i.e. directly in or on, is preferable to prevent steering sensation being distorted by play in, inter alia, the gearbox.

Figure 3:
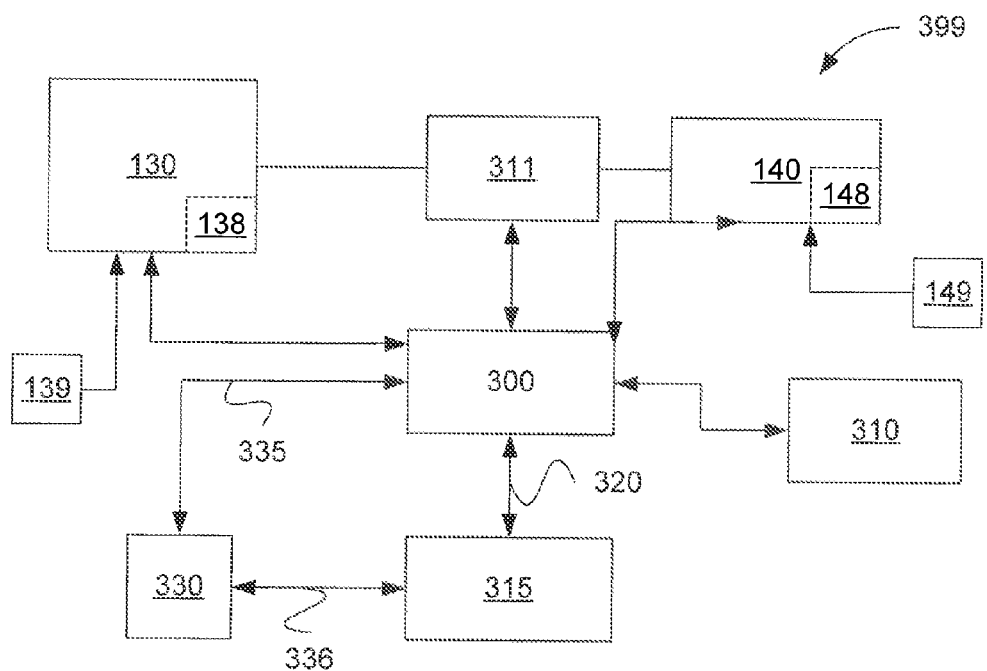
FIG. 3 depicts schematically a diagram of a vehicle subsystem for variation of steering sensation.

According to a version schematically depicted in FIG. 3, the devices 130,140 for varying the respective parameters of rotational resistance and inertial resistance are settable by an operator, e.g. the vehicle driver, to which end control means 139,149, e.g. push-buttons, circuit-breakers or the like which are accessible to the operator, are provided for acting upon operating means 138,148 in order to set the parameters as desired. It is in particular preferable that the operating means 138,148 for setting the parameters be electrical and hence capable of being acted upon by control signals which have activating effects.

According to another, in preferred cases supplementary, version, e.g. FIG. 3, an electric control unit 300 is adapted to receiving signals comprising information about, inter alia, the current driving situation. The control unit is preferably also adapted to receiving signals comprising a driving situation or steering sensation requested by an operator. The control unit 300 is adapted to using such information as a basis for acting upon the operating means in order to vary said rotational resistance and/or said moment of inertia.

The versions indicated are further commented on below.

The term "link" refers below to a communication link which may be a physical connection, such as an optoelectronic communication wire, or a non-physical connection such as a wireless connection, a radio link, microwave link or the like.

FIG. 3 depicts schematically a version of a subsystem 399 of a vehicle, which subsystem comprises inter alia a steering arrangement 110 schematically depicted in FIG. 1 with its steering column 115. As previously mentioned, an electronic control unit 300 is adapted to controlling the variation of said rotational resistance and moment of inertia. To this end, the control unit 300 according to the example depicted is signal-connected to variation means 310 for an operator and sensors 311, inter alia for setting of the device 130 for variation of rotational resistance and the device 140 for variation of moment of inertia. The control unit 300 is also signal-connected to operating means 138,148 respectively for the devices 130 for variation of rotational resistance and the devices 140 for variation of moment of inertia, which operating means 138,148 are comprised by the devices 130,140.

According to an example of a version, the method according to the present invention is initiated and controlled via the electronic control unit 300. According to an example, the control unit 300 is an electronic ECU of the vehicle. Alternatively, the method according to the present invention may be initiated and controlled via an external computer 315. The external computer may be directly connected to the control unit 300 via a link 320 but may also be indirectly connected to the control unit in some suitable way, e.g. by an internal vehicle network. Communication between the external computer 315 and the control unit 300 may be partly or totally wireless.

According to a version, the electronic control unit is adapted to communicating with a communication terminal 330 via a link 335. The external computer 315 is likewise adapted to communicating with the communication terminal 330 via a link 336. The communication terminal may be provided with a display and a user interface to enable a user to cooperate with the control unit. The communication terminal 330 is adapted to receiving and preferably displaying information relevant to the method according to the present invention, e.g. driving situation characteristics and current status of steering sensation parameters.

Figure 4:
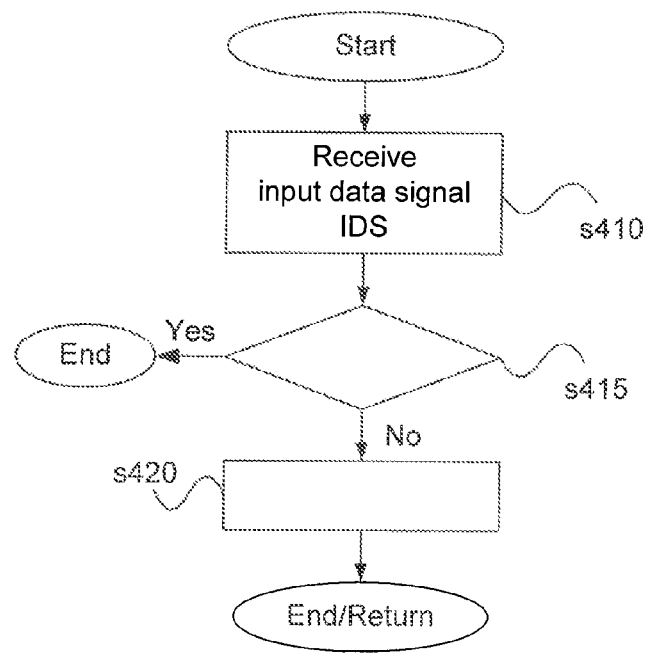
FIG. 4 depicts schematically a diagram illustrating the steps of a version of a method according to the present invention for variation of steering sensation.

FIG. 4 depicts schematically a method for variation of steering sensation or steering wheel sensation, according to a version according to the present invention.

The method comprises a first step s410 comprising the step of receiving in a control unit 300 of the vehicle, e.g. an ECU (electronic engine control unit), at least one input data signal IDS containing a request for setting of steering sensation by the control unit. Such requested setting may be predetermined and based on current driving situation. Such requested setting may also be based on individual wishes from the operator, the driver, in which case it may be predetermined or be a steering sensation setting desired specifically at the time. Step s410 is followed by a step s415.

Step s415 compares, in the control unit, a current steering sensation setting with a requested steering sensation setting. If it is found that the current steering sensation setting corresponds to the desired steering sensation setting, the method ends until a new input data signal with a new request is received by the control unit.

If step s415 finds a difference between the current steering sensation setting and the requested steering sensation setting, a subsequent step s420 is performed.

At step s420, the control unit 300 gives a signal to the operating means for the devices 130,140 to set steering sensation which corresponds to that requested. Thereafter the method ends until a new input signal with a new request is received by the control unit 300.

New signals may be supplied to the control unit intermittently or continuously at predetermined intervals of time. Supply of new input signals may also take place at the request of the operator as desired. New input signals may also be generated automatically, in which case they may arise, for example, from changes in the driving situation which call for adaptation of steering sensation to such changes.

Figure 5:
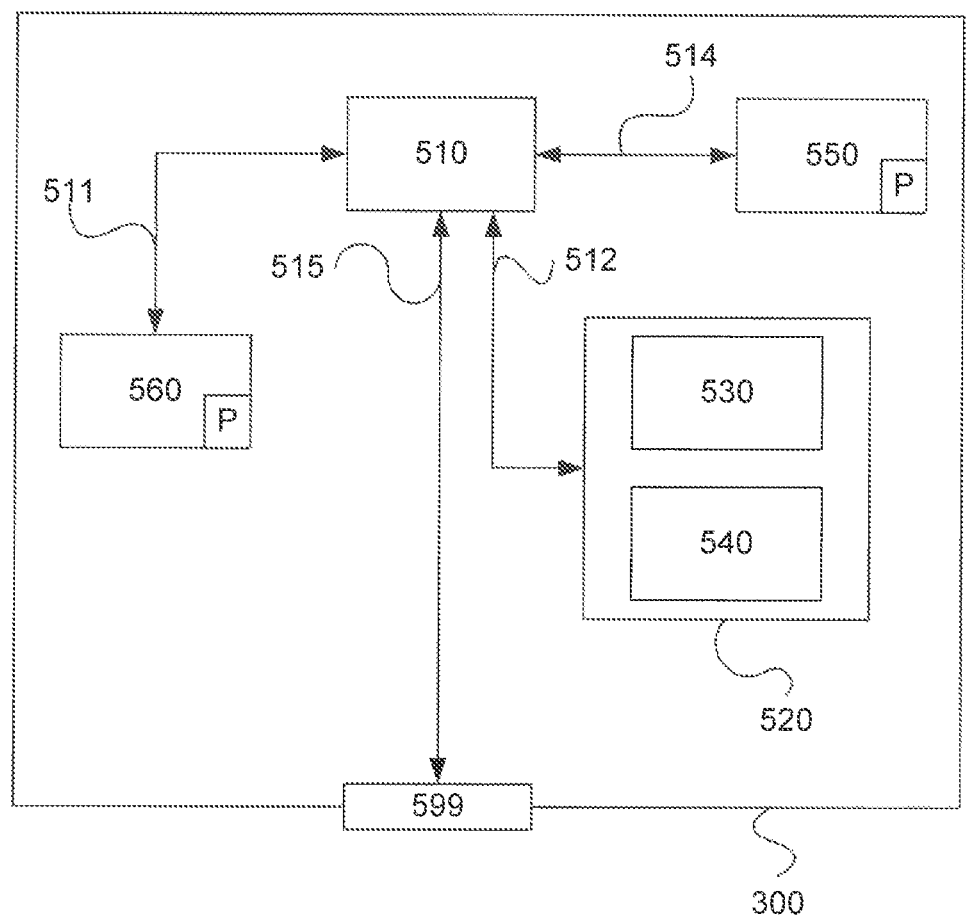
FIG. 5 depicts schematically a diagram of an embodiment of an electronic control unit according to the present invention.

FIG. 5 depicts a diagram of an embodiment of the electronic control unit 300. The electronic control unit is also here referred to as the apparatus. The apparatus comprises a non-volatile memory 520, a data processing device 510 and a read/write memory 550. The non-volatile memory 520 has a first memory element 530 in which a computer program, e.g. an operating system, is stored to control the function of the apparatus. The apparatus further comprises a bus control unit, a serial communication port, I/O means, an A/D converter, a time and date supply and transmission unit, an event counter and an interruption control unit (not depicted). The non-volatile memory 520 has also a second memory element 540.

A computer program P comprises routines for varying the steering sensation or steering wheel sensation, of a vehicle according to the present invention and may be stored in an executable manner or in a compressed state in a separate memory 560 and/or in the read/write memory 550. The memory 560 is a non-volatile memory, e.g. a flash memory, an EPROM, an EEPROM or a ROM. The memories 550 and 560 are computer program products.

Where it is stated that the data processing unit 510 performs a certain function, it means that the data processing unit 510 performs a certain part of the programme which is stored in the separate memory 560, or a certain part of the programme which is stored in the read/write 550.

The data processing device 510 can communicate with a data communication port 599 via a data bus 515. The non-volatile memory 520 is adapted to communication with the data processing device 510 via a data bus 512. The separate memory 560 is adapted to communication with the data processing device 510 via a data bus 511. The read/write memory 550 is adapted to communication with the data processing device 510 via a data bus 514.

Data relevant to the control programme for variation of steering sensation according to the present invention is stored in the memory 550 or 560 of the ECU. Input data are also stored in the memory 550 or 560 of the ECU and may be used to set status for the devices 130,140, process information concerning the current driving situation and generate output signals for acting upon operating means for the devices 130, 140.

When data, e.g. data carried by the input data signal IDS, are received on the data port 599 from, for example, respective variation means, they are stored temporarily in the second memory element 540. When the input data received have been temporarily stored, the data processing device 510 is set to effect code execution as described above. The data processing device 510 is adapted to varying the steering sensation as requested.

Parts of the method herein described may be effected by the apparatus by the data processing device 510 running the program stored in the separate memory 560 or the read/write memory 550. When the apparatus runs the program, parts of the method herein described are effected.

According to an aspect of the invention, the apparatus is adapted to running a computer program which comprises computer-readable means for causing the electronic control unit or another computer connected to the electronic control unit to perform the steps specified in FIG. 4.

The invention relates also to a computer program product comprising a computer program for varying the steering sensation of a vehicle, and a computer-readable medium on which the computer program is stored. The invention relates also to a computer, e.g. an enclosed electronic control unit or a vehicle-external computer for a vehicle, comprising storage means and a computer program for varying the steering sensation of the vehicle, stored in storage means.

The method and also the function of the device according to the present invention are perhaps substantially and sufficiently indicated by the description given above. The same also applies to the computer program, the computer program product, the computer and the vehicle according to the present invention.

The present invention affords a number of substantial advantages as compared with the state of the art.

The invention offers technology with great flexibility and precision for variation of steering sensation or steering wheel sensation.

The technology according to the invention may thus be configured so that an operator, a vehicle driver, can by variation means, e.g. push-buttons or the like, freely and directly set rotational resistance and moment of inertia as desired.

The technology according to the invention may also be configured as a system with a control unit via which setting of rotational resistance and moment of inertia for steering sensation can be ordered, whereby the steering sensation is preferably predeterminedly adapted to the current driving situation, information about the driving situation can be supplied to the control unit, inter alia from sensors etc. of the vehicle's internal control system, or be indicated by the operator, and the steering sensation for setting may be predetermined, e.g. based on the vehicle manufacturer's experience, on individual wishes from the operator etc.

According to preferred embodiments, the devices for setting of rotational resistance and moment of inertia are operable electrically, which is advantageous for control via signals from the control unit.

According to preferred embodiments, the steering column is of articulated configuration with mutually articulated column elements 117,118, and the devices 130,140 for variation of rotational resistance and moment of inertia are adapted to acting upon the column element which is nearest to the steering wheel.

The following are some exemplifying circumstances in which it is advantageous to carry out automatic or manual alteration of steering sensation:
  hard braking manoeuvres in which much feedback may be required and steering angle errors perhaps occur because of down-springing on today's front axles of trucks;
  foreseeable hard braking maneuvers, e.g. by adaptive cruise control which detects vehicles ahead of the respective vehicle and monitors mutual spacing;
  (e.g. foreseeable) avoidance maneuvers;
  motorway driving vs national highway driving vs urban traffic vs maneuvering;
  engagement of antiskid systems;
  poor (defective) road surface, e.g. detected by air suspension control systems;
  slippery road surface or risk of slippery road surface, e.g. for an outdoor temperature between $-5°$ C. and $+4°$ C.

The invention claimed is:

1. A method for variation of steering sensation in a steering arrangement of a vehicle, wherein the steering arrangement comprises a steering column via which rotary motion is transmitted between an operating device which rotates the steering column and a servo device of the steering arrangement, the method comprising:
  settably varying rotational resistance of the steering column with regard to its rotary motion by means of a brake device,
  settably adding a variable first moment of inertia of devices to which the rotary motion is transmitted to a second moment of inertia of the steering column with regard to its rotary motion, the devices to which said rotary motion is transmitted comprising at least one weight element, a rigid connector connecting the at least one weight element to the steering column, the rigid connector being configured such that the at least one weight element can be fixed at variable positions relative to an axis of rotation of the devices to which the rotary motion is transmitted, and
  activating the settable variations manually via an operator, and/or automatically.

2. The method according to claim 1, wherein the rotational resistance of the steering column is varied by means of brake devices of a friction-generating kind.

3. The method according to claim 1, wherein the rotational resistance of the steering column is varied by means of brake devices of the magnetorheological damper devices type.

4. The method according to claim 1, wherein the variation of the first moment of inertia results, at least in part, from redistribution of weight of the at least one weight element.

5. The method according to claim 1, wherein the at least one weight element can be moved substantially transversely relative to the axis of rotation of the devices to which the rotary motion of the steering column is transmitted.

6. The method according to claim 1, further comprising varying the steering sensation manually by an operator operating controls configured to act upon operating means to set the rotational resistance of the steering column and the first moment of inertia of the devices to which said rotary motion is transmitted.

7. The method according to claim 1, further comprising varying the steering sensation by setting the rotational resistance and/or the first moment of inertia upon request by a control unit configured to act upon operating means to set the rotational resistance of the steering column and the first moment of inertia of the devices to which said rotary motion is transmitted.

8. The method according to claim 7, wherein variation by the control unit is automatic and predetermined.

9. The method according to claim 7, wherein variation by the control unit is on the basis of information concerning the current driving situation.

10. The method according to claim 7, wherein variation by the control unit is based on information concerning an operator's individual wishes.

11. The method according to claim 1, further comprising varying the rotational resistance and the first moment of inertia by acting upon a steering column element which is directly connected to the operating device.

12. A device for varying the steering sensation in a steering arrangement of a vehicle, wherein the steering arrangement comprises a steering column via which rotary motion is transmitted between an operating device for rotating the steering column, and a servo device of the steering arrangement,
the device for varying comprising:
brake devices configured and operable for settable variation of rotational resistance of the steering column with respect to the rotary motion thereof;
devices configured for settably adding a variable first moment of inertia to a second moment of inertia of the steering column, related to the rotary motion of the steering column, the rotary motion being transmitted to the devices configured for settable addition, the devices configured for settable addition comprising at least one weight element, a rigid connector connecting the at least one weight element to the steering column, the rigid connector being configured such that the at least one weight element can be fixed at variable positions relative to an axis of rotation of the devices configured for settable addition; and
devices for activating said variation manually and/or automatically.

13. The device according to claim 12, wherein the brake devices comprise brake devices of a friction-generating kind and configured for variation of the rotational resistance of the steering column related to the rotary motion of the steering column.

14. The device according to claim 12, wherein the brake devices comprise magnetorheological damper devices configured for variation of the rotational resistance of the steering column relating to the rotary motion.

15. The device according to claim 12, wherein the variation of the first moment of inertia results, at least in part, from redistribution of weight of the at least one weight element.

16. The device according to claim 12, wherein the at least one weight element can be moved substantially transversely relative to the axis of rotation of the devices configured for settable addition.

17. The device according to claim 12, further comprising a manually operable control which is configured to be acted upon manually to set the rotational resistance and the variable first moment of inertia.

18. The device according to claim 12, further comprising a control unit configured for receiving information concerning requests for variation of steering sensation and for using the information received as a basis for automatically and predeterminedly acting upon an operating device to vary the rotational resistance and/or the variable first moment of inertia in order to provide a requested and/or a predetermined steering sensation.

19. The device according to claim 12, wherein the devices for variation of the rotational resistance and addition of the variable first moment of inertia are situated close to an operating device for the steering column for substantially play-free provision of the rotary motion.

20. The device according to claim 19, wherein the steering column is of an articulated configuration, the steering column comprises at least two column elements which are mutually articulated at respective joined ends thereof, and the devices for variation of the rotational resistance and addition of the variable first moment of inertia are configured to act upon the steering column element situated nearest to the operating device.

21. The device according to claim 12, wherein the devices. for variation of the rotational resistance and addition of the variable first moment of inertia are operable electrically.

22. A computer program, stored on a non-transitory computer-readable medium, for variation of steering sensation in a steering arrangement of a vehicle, wherein the steering arrangement comprises a steering column via which rotary motion is transmitted between an operating device, and a servo device of the steering arrangement, the computer program comprising:
computer-readable program code programmed for causing an electronic control unit or another computer connected to the electronic control unit to perform steps including:
settably varying the rotational resistance of the steering column in relation to the rotary motion by operating brake devices for the steering column, and
settably adding a variable first moment of inertia of devices to which the rotary motion is transmitted to a second moment of inertia of the steering column related to the rotary motion, the devices to which the rotary motion is transmitted comprising at least one weight element, a rigid connector connecting the at least one weight element to the steering column, the rigid connector being configured such that the at least one weight element can be fixed at variable positions relative to an axis of rotation of the devices to which the rotary motion is transmitted, the variations of the rotational resistance and the first moment of inertia being activated manually and/or automatically on the basis of at least one input data signal to the electronic control unit or to the other computer connected to the electronic control unit.

23. The computer program according to claim 22, wherein the program is configured to cause the electronic control unit or the other computer connected to the electronic control unit to:
receive at least one data input signal containing a request for setting of the steering sensation, compare a current steering sensation setting with a requested steering sensation setting, cease variation if a current steering sensation setting is found to correspond to a requested steering sensation setting, until a new data input signal is received, give predetermined signals to devices to set the steering sensation corresponding to a requested predetermined steering sensation if the steering sensation is found to be different from the requested predetermined steering sensation, and ceasing variation until a new input data signal (IDS) is received.

24. The computer program according to claim 23, wherein the requested steering sensation setting is predetermined and is based on a current driving situation.

25. The computer program according to claim 23, wherein the requested steering sensation setting is predetermined and is based on individual operator wishes or on a steering sensation setting desired specifically at the time.

26. The computer for a vehicle comprising a memory in which is stored a computer program according to claim 22.

27. The vehicle comprising a computer according to claim 26.

28. The vehicle according to claim 27, in which the vehicle is a heavy vehicle.

29. The vehicle comprising a device according to claim 12.

30. The vehicle according to claim 29, in which the vehicle is a heavy vehicle.

31. The method according to claim 1, wherein the rigid connector is configured to rotate so as to produce a movement of the at least one weight element relative to the axis of rotation of the devices to which the rotary motion is transmitted.

32. The device according to claim 12, wherein the rigid connector is configured to rotate so as to produce a movement of the at least one weight element relative to the axis of rotation of the devices configured for settable addition.

33. The computer program according to claim 22, wherein the rigid connector is configured to rotate so as to produce a movement of the at least one weight element relative to the axis of rotation of the devices to which the rotary motion is transmitted.

* * * * *